Oct. 18, 1949.　　J. M. COOK ET AL　　2,485,359
COOKING STOVE OR RANGE
Filed April 5, 1945　　8 Sheets-Sheet 1

INVENTORS.
JAMES M. COOK
BY SHIRLY C. SALTER

Earl T. Chappell
ATTORNEYS.

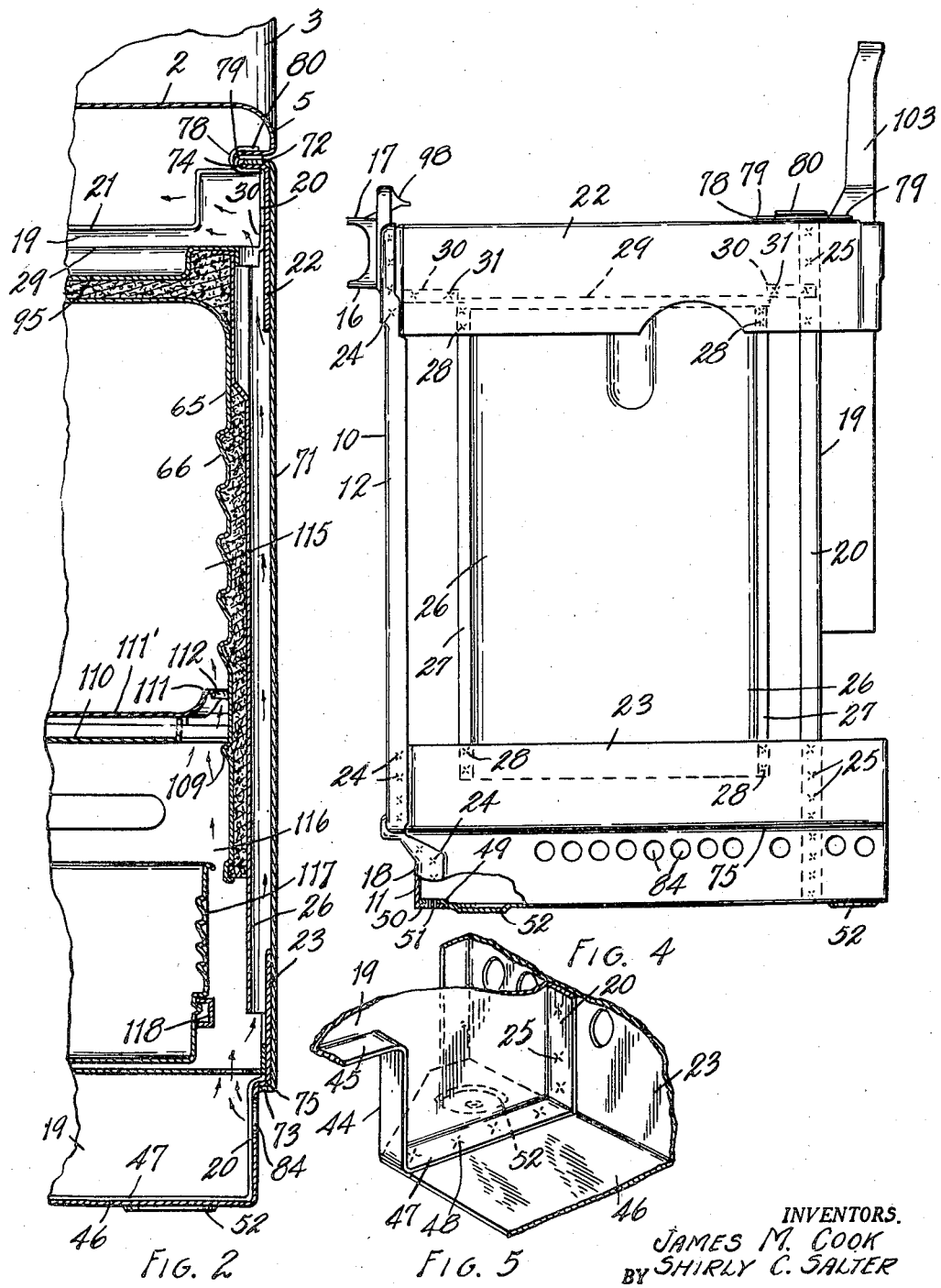

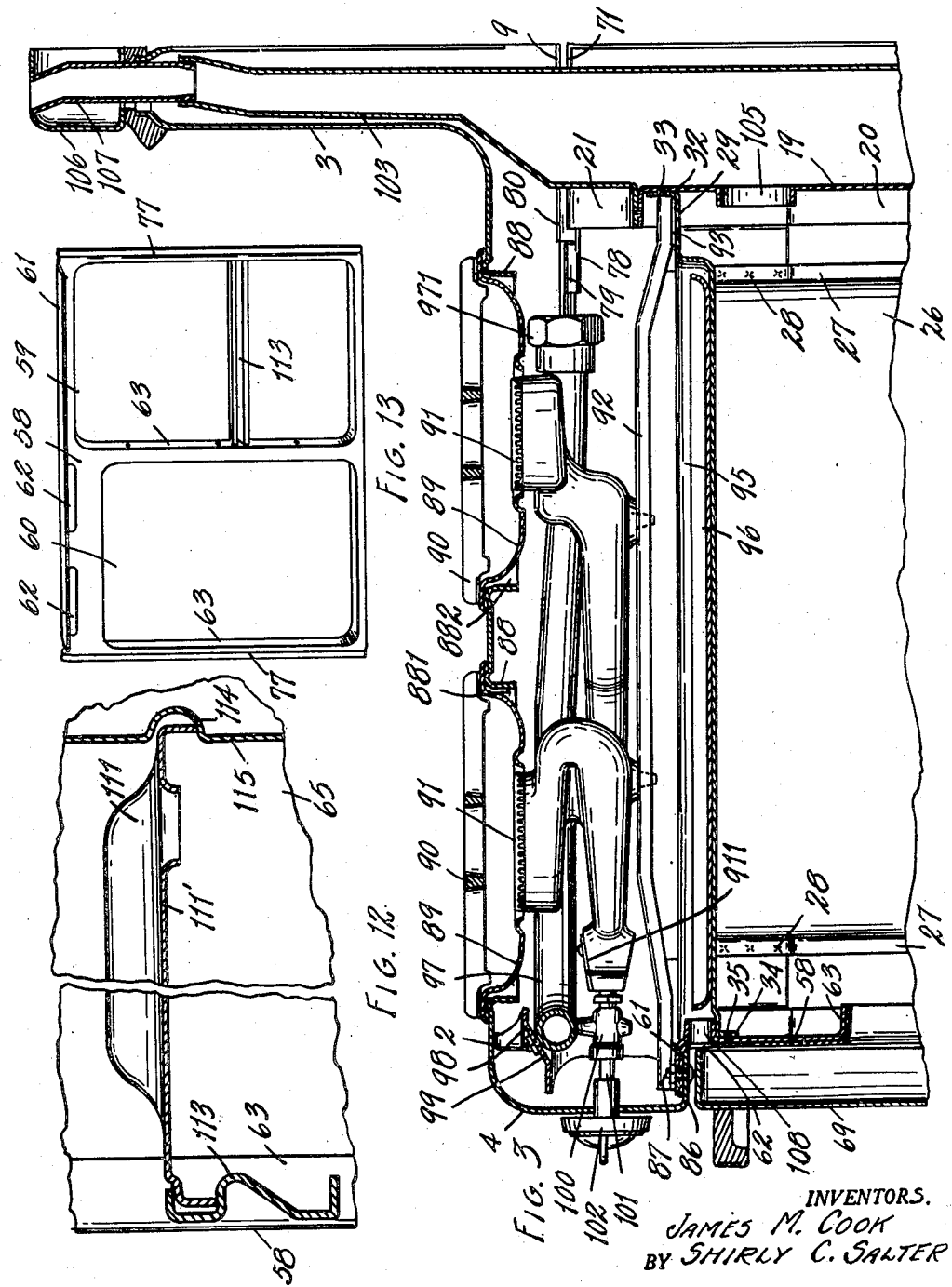

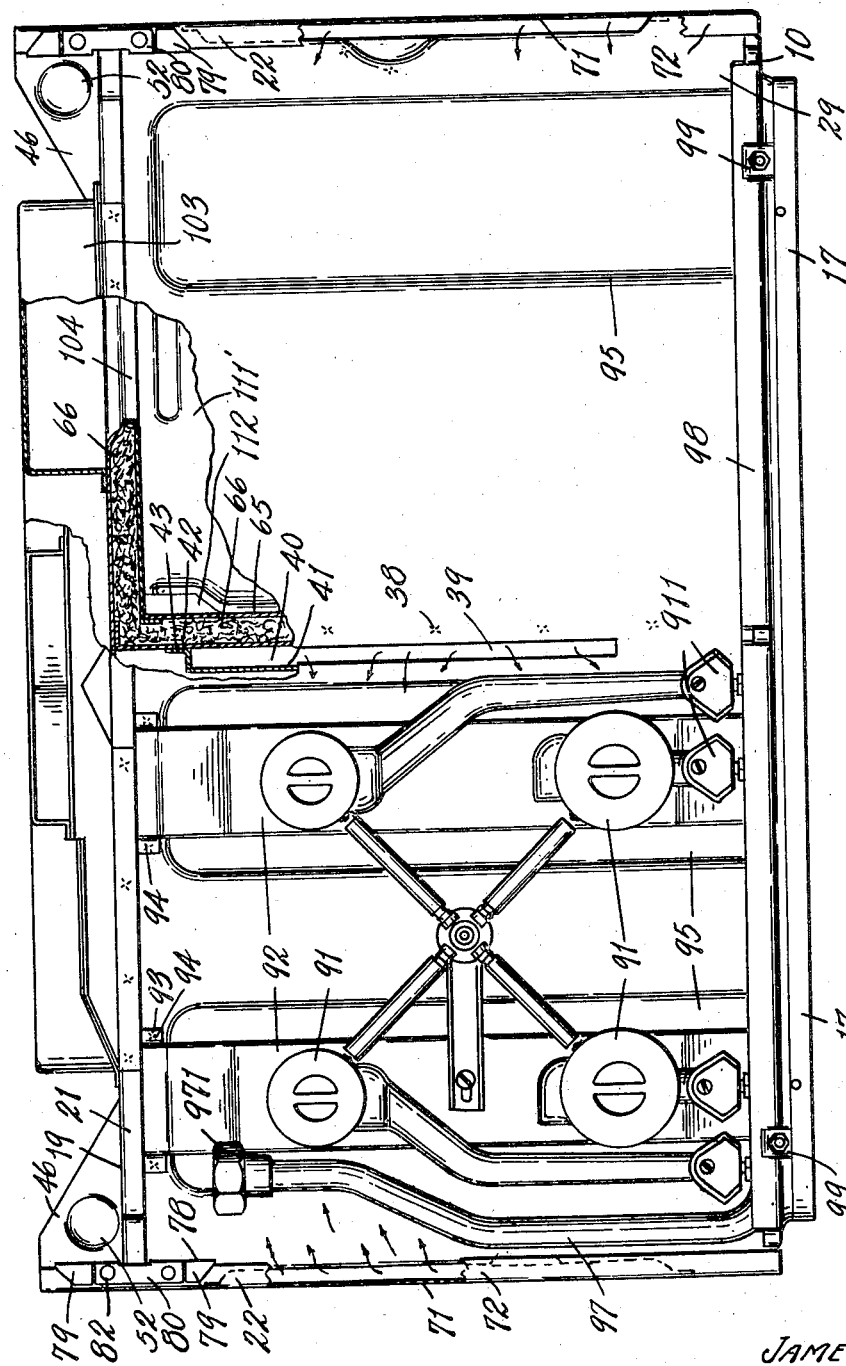

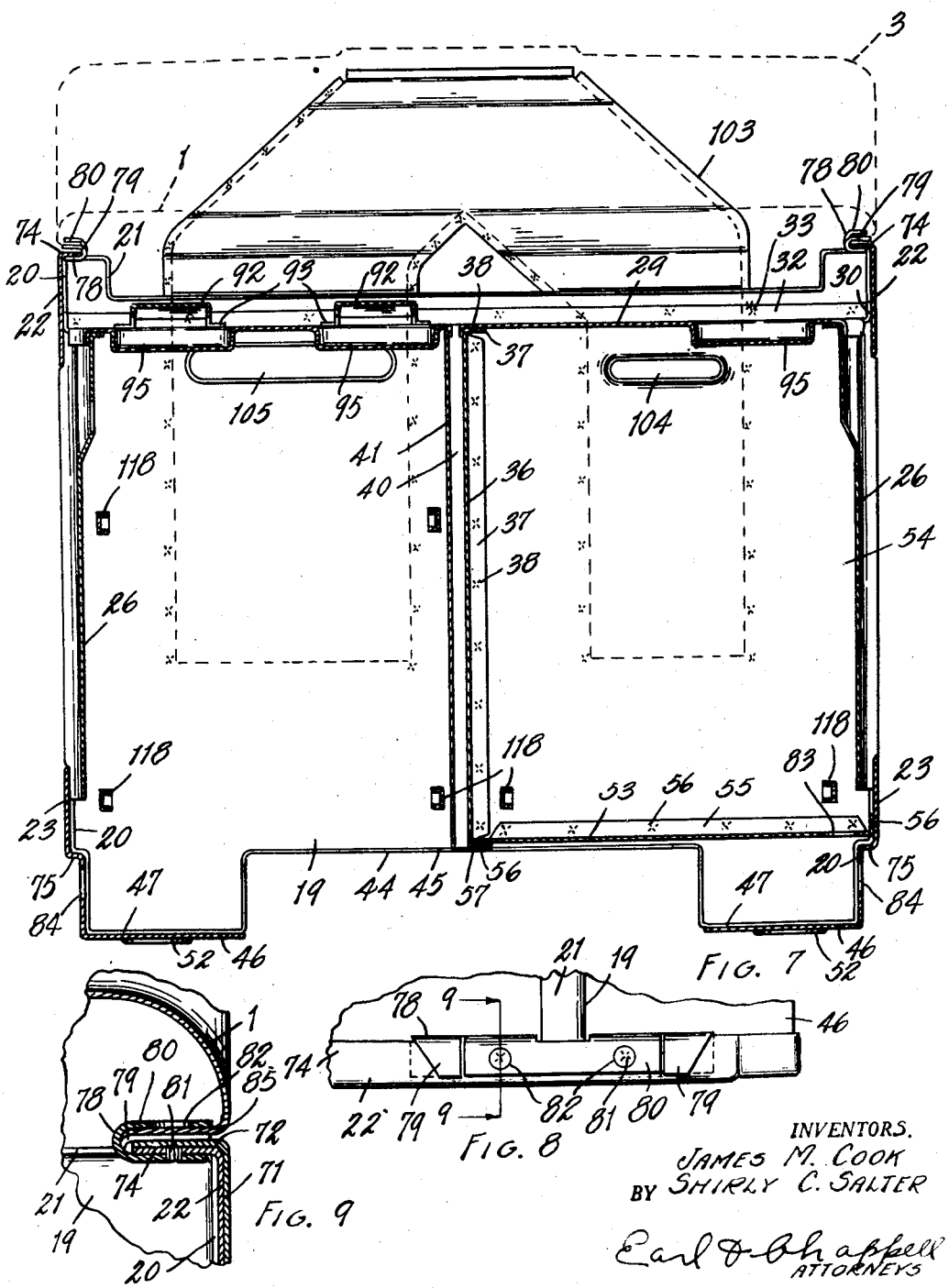

Oct. 18, 1949.     J. M. COOK ET AL     2,485,359
COOKING STOVE OR RANGE
Filed April 5, 1945              8 Sheets-Sheet 6

INVENTORS.
JAMES M. COOK
BY SHIRLY C. SALTER
ATTORNEYS.

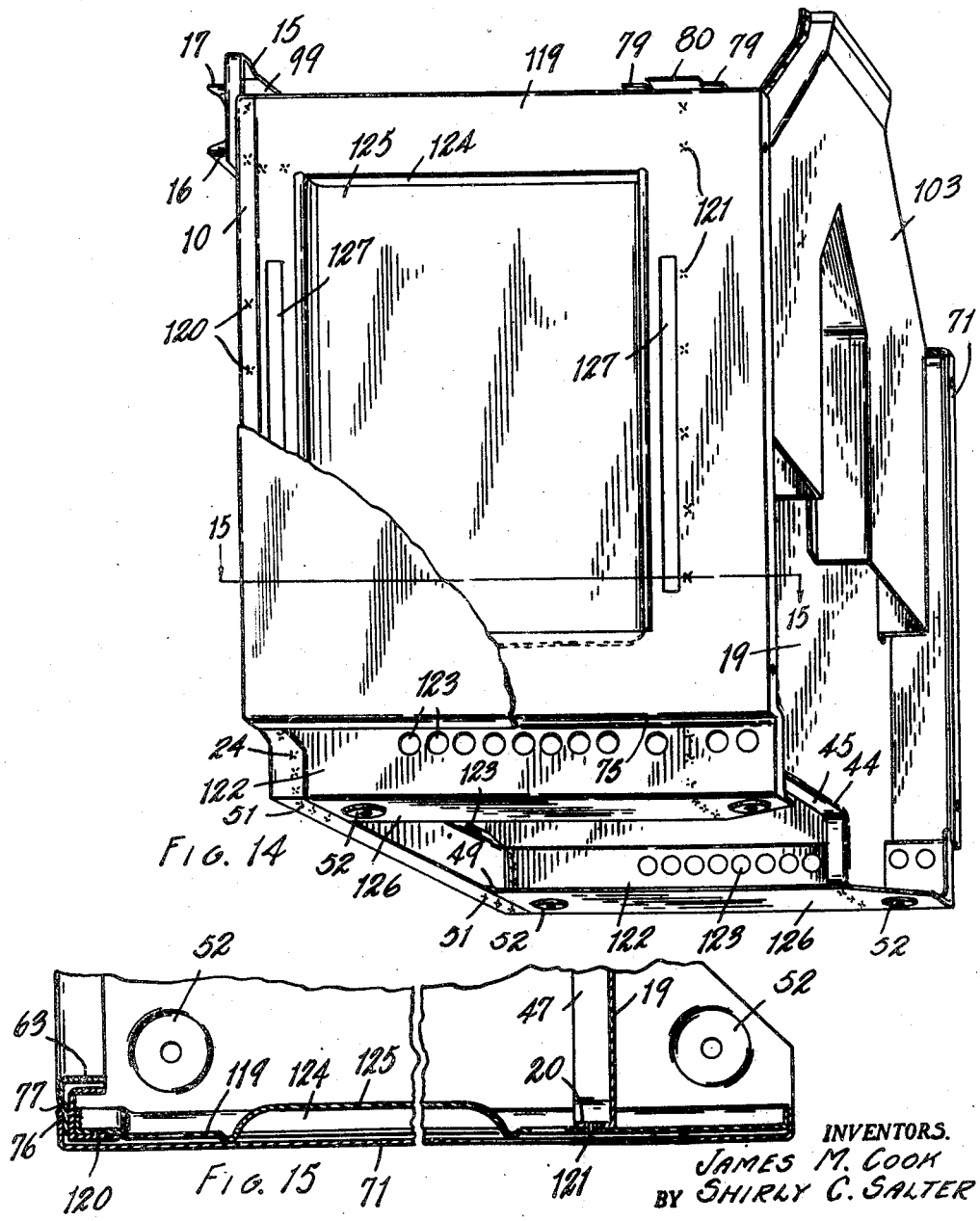

Oct. 18, 1949.  J. M. COOK ET AL  2,485,359
COOKING STOVE OR RANGE
Filed April 5, 1945  8 Sheets-Sheet 8

INVENTORS.
JAMES M. COOK
SHIRLY C. SALTER
BY
Earl Chappell
ATTORNEYS.

Patented Oct. 18, 1949

2,485,359

UNITED STATES PATENT OFFICE 2,485,359

COOKING STOVE OR RANGE

James M. Cook and Shirly C. Salter, Kalamazoo, Mich., assignors to Kalamazoo Stove & Furnace Company, Kalamazoo, Mich., a corporation of Michigan Application April 5, 1945, Serial No. 586,702

20 Claims. (Cl. 126—39)

The main objects of this invention are:

First, to provide a cooking stove or range having a seamless top including a top surface, a back wall or fence of substantial height and a depending front flange or apron.

Second, to provide a stove structure formed mainly of sheet metal and one which while of relatively light weight is strong and rigid and capable of withstanding severe wracking stresses and strains.

Third, to provide a cooking stove or range structure so constructed as to provide for circulation of air within the structure thereby protecting adjacent walls or objects from excessive or undesirable heat.

Fourth, to provide a structure in which all exposed parts may be effectively enameled as units prior to assembling and assembled without injury to the enamel.

Fifth, to provide a structure in which the fastenings for the parts constituting the frame or body portion are concealed in the completed structure.

Sixth, to provide a cooking stove or range having a frame or body structure which may be assembled as a unit for shipment or storage with the enameled parts separately packed or stored to be assembled with the frame or body unit by relatively unskilled workmen.

Seventh, to provide a cooking stove or range in which the burner chamber is provided with an adequate supply of air without exposed openings or grilles in prominent portions of the structure.

Eighth, to provide a cooking stove or range which is highly attractive in appearance and at the same time may be very economically produced.

Ninth, to provide a stove structure of the class described, the main features of which are adapted for use either in a gas stove or an electric stove, certain features however of the structure illustrated being especially adapted for a gas stove structure.

Objects relating to details and economies of the invention will appear from the description to follow. The invention is defined and pointed out in the claims.

Preferred embodiments of the invention are illustrated in the accompanying drawings, in which:

Fig. 2 is an enlarged fragmentary view in vertical section on a line corresponding to line 2—2 of Fig. 1.

Fig. 3 is a fragmentary view mainly in transverse vertical section on line corresponding to line 3—3 of Fig. 1.

Fig. 4 is an end elevation with the end wall panel and top removed.

Fig. 5 is an enlarged fragmentary inside perspective view showing details of the frame or body structure.

Fig. 6 is a fragmentary plan view partially in horizontal section with the top removed.

Fig. 7 is a vertical longitudinal section with the end wall panels removed, the top being shown in dotted lines.

Fig. 8 is an enlarged fragmentary plan view of the frame or body assembly as shown in Fig. 7.

Fig. 9 is an enlarged fragmentary sectional view on line 9—9 of Figs. 1 and 8.

Fig. 12 is an enlarged fragmentary view in section on line 12—12 of Fig. 1 showing details of the oven structure and its support.

Fig. 13 is a front perspective view of the outer enameled front member.

Fig. 14 is a fragmentary bottom and rear perspective view of a modified form or embodiment of the invention.

Fig. 15 is a fragmentary view in horizontal section on a line corresponding to line 15—15 of Fig. 14.

The preferred embodiment of the invention illustrated in the accompanying drawings is a gas stove or range having four cooking top burners, an oven, and a warming oven. The structure is designed to be a substantially fully enameled structure—that is, the top and wall panels and outer front frame, oven doors and the like are completely or fully enameled.

Figure 16:
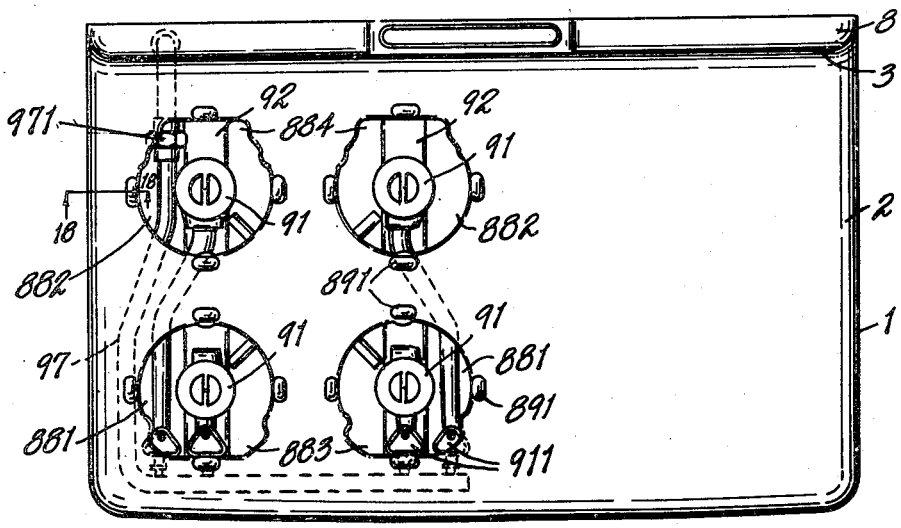
Fig. 16 is a top plan view of the stove.

The top designated generally by the numeral 1 comprises the stove top portion 2, the rear wall or fence portion 3 and the depending front or apron portion 4 formed as an integral or unitary stamping, these parts having end flanges 5, 6 and 7 at their end edges, the rear wall 3 having a rearwardly extending flange 8. The relation of these parts is clearly disclosed in Figs. 1, 16 and 17, the end flanges 5 having inturned flange-like portions 9, see Fig. 18, for a purpose which will appear as the description proceeds.

Figure 1:
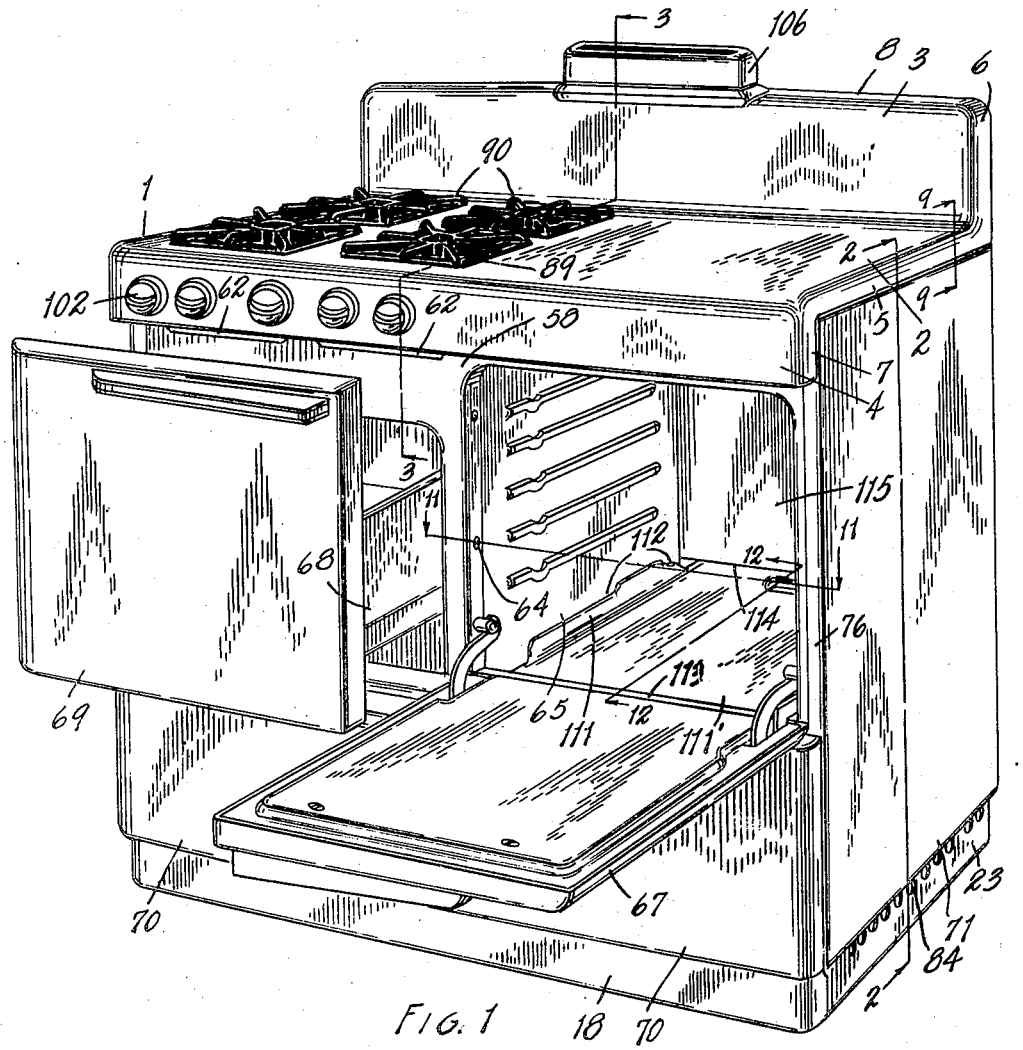
Fig. 1 is a front perspective view of a cooking stove or range embodying the features of the invention, the oven door being open and the warming oven drawer partially withdrawn.
Figure 10:
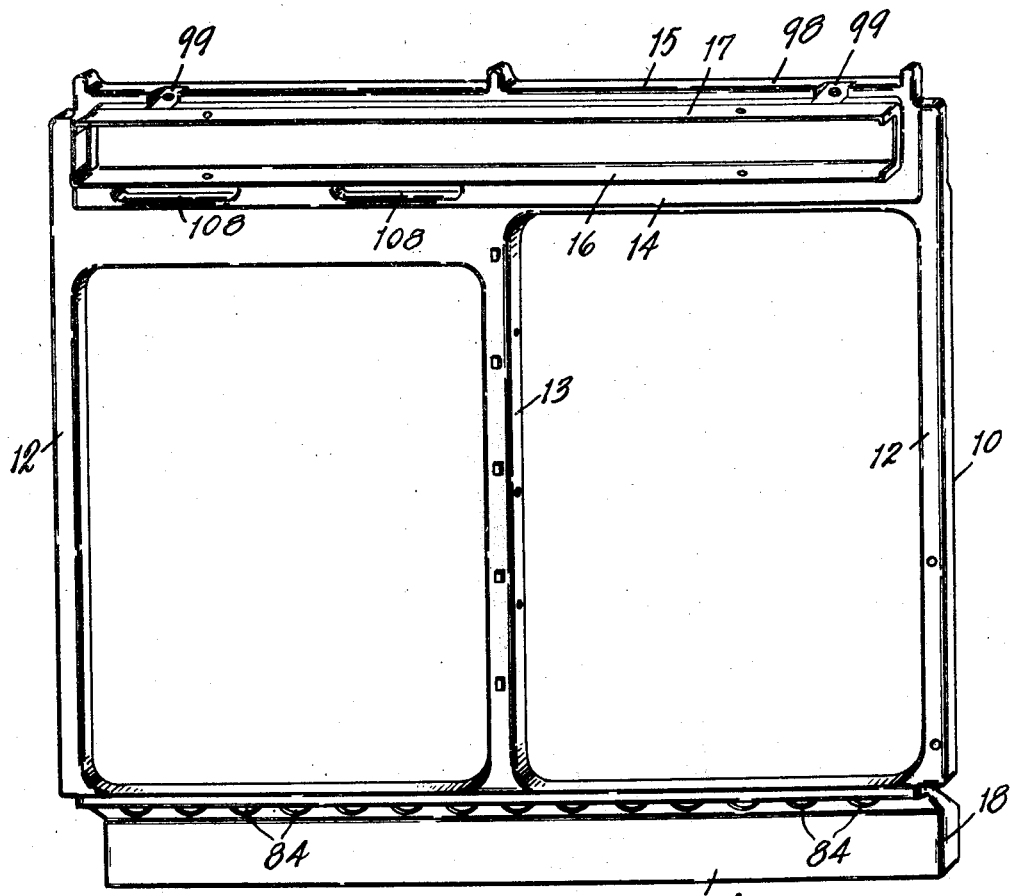
Fig. 10 is a front perspective view of the unitary front frame member.

The frame or body unit designated generally by the numeral 10, see Fig. 10, is formed as an integral stamping and comprises a bottom cross member 11, outer uprights 12, intermediate upright 13 and vertically spaced cross members 14 and 15. The uprights 12 and 13 are of inwardly facing channel section. The adjacent edges of the cross members 14 and 15 have outwardly projecting flanges 16 and 17, respectively. The cross member 14 has inturned flanges at its lower edge merging with the flanges of the uprights while the bottom cross member has inturned flanges merging with the flanges of the uprights as is shown in Fig. 10. The bottom portion of this main inner front frame unit is inwardly offset as at 18, as is shown in Fig. 4, thus providing an inset base as is also shown in Fig. 1.

The sheet metal back wall 19 has forwardly turned flanges 20 at its end edges and a forwardly turned flange 21 at its top edge, see Figs. 2, 3, 4 and 9.

The inner front frame is connected to the rear wall by top and bottom members 22 and 23, the front ends of these members being disposed on the inner sides of the outer flanges of the upright portions 12 of the front main frame and welded thereto as indicated at 24 and also welded to the rearwardly turned flanges of the inset bottom portion of the main front frame as shown in Fig. 4. These top and bottom members 22 and 23 are welded to the end flanges of the rear wall 19 as indicated at 25 in Fig. 4.

The vertical flue members 26 are of outwardly facing channel section and extend vertically between the members 22 and 23 and are provided with out-turned flanges 27 which are welded to the inner sides of the members 22 and 23 as indicated at 28.

The burner bottom 29 also formed as a sheet metal stamping extends from end to end of this frame or body structure and is provided with end flanges 30 which are welded at 31 to the inner sides of the top cross members 22. This burner chamber bottom member has an upstanding flange 32 at its rear edge welded to the rear wall 19 as shown at 33, see Figs. 3 and 7. It will be noted that the top and bottom cross members project beyond the rear wall 19 for purposes which will be brought out as the description proceeds.

The burner chamber bottom member 29 has a downturned flange 34 at its front end disposed within the inwardly facing channel-shaped member 14 of the main frame member and welded thereto as shown at 35.

Figure 11:
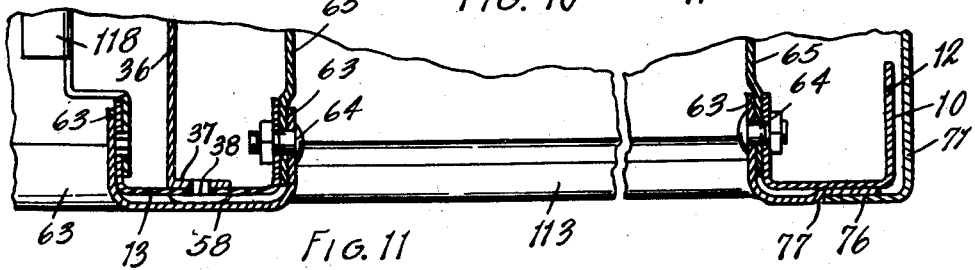
Fig. 11 is an enlarged fragmentary view in horizontal section on line 11—11 of Fig. 1.

The vertical partition member 36 extends from front to rear and is provided with laterally disposed flanges 37 at the top and vertical edges thereof, these flanges being spot-welded at 38 to the rear wall, the under side of the burner chamber wall 29 and to the inner side of the intermediate upright 13 of the front main frame, as shown in Figs. 7 and 11. The burner chamber wall 29 has a slot-like air inlet opening 39 therein, the flue 40 constituted by the wall 36 and the flue member 41 which has flanged vertical edges 42 welded to the partition member 36 at 43. This flue or air passage 40 is open at the bottom.

It should be noted that the back or rear wall 19 is partially cut away at the bottom or has a central recess 44, see Fig. 7, its bottom edge being provided with a continuous forwardly turned flange 45. This provides a reinforcement for the bottom of the wall and also provides means for attachment of the inner wall to the inturned bottom portions 46 of the bottom cross members 23, see Figs. 5 and 7, the flanged bottom portions 47 of the flange 45 being spot-welded at 48 to these inturned bottom portions 46 of the bottom cross members 23. These inturned bottom portions 46 of the bottom cross members extend from end to end of the cross members and are upwardly offset at 49 to overlap the bottom flange 50 of the front member and are welded thereto at 51. These inturned bottom portions 46 are struck downwardly or have downward bosses 52 adjacent the ends thereof, these constituting supporting feet and slides for the stove structure.

An oven chamber bottom panel 53 extends horizontally across the bottom of the oven chamber 54 and has upwardly turned flange 55 welded at 56 to the rear wall or to the inner side of the bottom cross member, see Fig. 7. The inner edge of this bottom wall 53 laps upon the flange 57 of the partition member 36 and is welded thereto at 56, see Fig. 7. This provides a very rigid frame structure or unit formed entirely of sheet metal stampings or drawn parts which may be of relatively light gauge and at the same time the parts are so arranged and connected as to provide a very rigid unit and one to which the outer enameled parts may be readily attached without exposed attaching elements.

We have described the top unit.

The front ornamental door frame unit designated generally by the numeral 58 is formed as a frame-like stamping, its openings 59 and 60 being surrounded by inturned flanges. This member has an out-turned flange 61 at the top thereof with slot-like openings 62 below this flange 61. The vertical inturned flanges 63 of this outer frame member embrace and are secured by the bolts 64, see Fig. 11, to corresponding parts of the inner body member, the oven liner wall 65 being arranged within the flanges 63 so that they are clamped in position. Insulating material 66 is provided as shown in Fig. 2.

The oven door 67 is provided with suitable hinges and stops and is designed to close against the front of the outer or ornamental frame. The warming oven or drawer 68 is provided with an ornamental front wall 69 which is also adapted to close against the ornamental front frame. Ornamental closure panels 70 are provided below the oven door and the warming oven.

The end panels or end walls 71 are provided with inturned flanges 72 at their upper ends and inturned flanges 73 at their lower ends, see Fig. 2, the flanges 72 overlapping the inturned flanges 74 on the upper edges of the top cross members 22 while the flanges 73 engage below the shoulders 75 formed by the insetting of the lower portion of the bottom cross members 23. These side wall panels have inturned front flanges 76 overlapping the front outer or ornamental frame which is shouldered at 77, see Fig. 11, to provide sustantially flush joints. The side panels are in effect snapped into position but they are further secured by means of the clips 78 which are of U-shape or channel section having portions 79 thereof adapted to engage the top flanges of the end wall panels and to the portions 80 adapted to engage flanges on the top as will be pointed out. These clips are preferably formed of somewhat springable metal, see Figs. 2, 7, 8 and 9, and are welded at 81, see Fig. 9, to the inturned flange on the top cross member. Holes 82 are provided in the clips to facilitate this welding, see Figs. 8 and 9. These panels coact with the conduit members 26 in providing air passages delivering to the burner chamber and also permitting a flow of air to cool the end walls.

The oven chamber bottom member 53 is provided with openings 83 through which air may flow to the lower open end of these conduits as indicated in Fig. 2, the end members 23 and inset portion 18 of the cross member 11 being provided with a series of air inlet openings 84.

The top unit 1 has, as stated, inturned portions 85 on its end flanges 5, these being engaged by the portion 80 of the clips 78. The top has inturned flanges 86 on its apron and depending front portion 4, these being lapped under and secured to the outwardly directed flanges 16 of the inner or main front frame, see Figs. 3 and 10, bolts 87 being provided for this purpose.

The structure illustrated is a four burner gas burning stove although the structure generally is adapted for liquid or electric burners. The front and rear burner openings 881 and 882 are of irregular outline or shape and are surrounded by downturned flanges 88. The burner openings 881 have extensions or enlargements 883 to afford access to the burner air valves 911. The enlargements 884 of the rear burner openings 882 permit ready access to the connections 971 for the gas service pipes. This is a matter of substantial convenience in installing and servicing the stove. The burner openings are adapted to receive aeration bowls 89 which are supported in spaced relation to the surface by means of the bosses 891. the burner bowls are adapted to support the grids 90. These burner bowl and grid features are the subject matter of the patent to Shirly C. Salter, Robert C. Lang and James M. Cook, No. 2,429,279, issued October 21, 1947.

Figure 20:
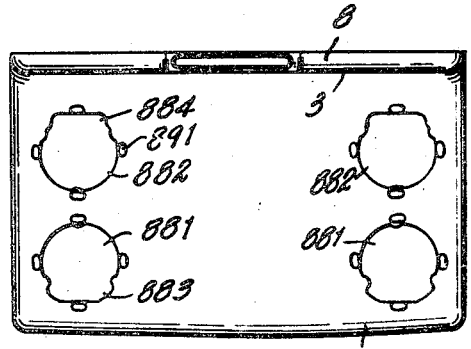
Fig. 20 is a plan view of a modified form or embodiment of the invention in which a pair of burners is disposed at each end.

The burners 91 are supported on cross bars 92 extending from front to rear of the burner chamber having out-turned ears 93 at their rear ends which are spot-welded at 94 to the bottom wall of the burner chamber. The bottom wall of the burner chamber is provided with recesses 95 below the burners or these burner supporting bars and are adapted to receive the drip pans 96. In the embodiment illustrated, there are three of these depressed recess portions 95 so that if desired the structure may have two burners at each end as shown in Fig. 20.

The gas supply pipe 97 is supported by the inwardly projecting top flange 98 of the top member 15 of the inner frame, there being recesses 99 in this portion, the bottoms of which are inclined to permit the conduit 97 being drawn against the same and bolted thereto.

The valves 100 are provided with stems 101 projecting through the apron of the top and having finger pieces 102 in front of the apron, see Fig. 3. The flue member 103 is secured to the rear wall 19, this being preferably branched as shown in the drawings, there being an opening 104 through the rear wall of the oven communicating with this vent and also an opening 105 from the warming oven compartment. This flue also constitutes an air circulating device, the branches being open at the bottom so that cool or outside air may circulate therethrough.

An outlet 106 is mounted on the top of the rear wall or fence 3 and is connected to the flue through the passage 107 to discharge into the room. It may of course be connected to an outside flue if desired.

The openings 62 in the inner front frame and the registering openings 108 in the outer frame are of such dimensions that the drip pans 96 may be inserted and removed therethrough. The inner walls or insulating walls for the oven are provided with ledges 109 on which the baffle plate 110 is supported. The oven bottom 111' has upwardly directed deflecting portions 111, the edges of which are spaced from the wall to provide air openings 112, see Figs. 1 and 2. The front edge of this oven bottom is engaged with a support 113 while the rear edge is engaged with a support 114 in the rear liner wall 115 of the oven.

The burner is positioned in the oven burner chamber 116 below the oven bottom. The front panel 70 provides a closure for the burner chamber which also constitutes a broiler chamber, the broiler drawer 117 being supported on the slide rails 118.

In the modified form of the invention shown in Figs. 14 and 15, a complete inner wall panel 119 is substituted for the top and bottom members 22 and 23 and the vertical flue panel 26. The end panel 119 is welded to the inwardly projecting flange on the vertical edge of the inner front frame member as shown at 120 in Figs. 14 and 15 and to the flanges 20 on the vertical edges of the rear wall as indicated at 121.

The bottom portion of the member 119 is inset to provide the bottom element 122 and has perforations 123 therein for admitting air to the air flue 124 constituted by the inset portion 125 of the member 119 and the outer panel 71 which is supported in the same way as in the previously described structure. In this embodiment, the bottom flange 126 is on the end wall member 119 and performs the function of the bottom flange or inturned portion 46 described. The member 119 is vertically slotted at 127 to facilitate welding.

In Fig. 20, the stove top member 128 has a pair of burner openings at each end thereof, the burner chamber bottom member 29 having a depressed portion 95 as previously described to permit the burners being located at the ends.

Figures 17, 19:
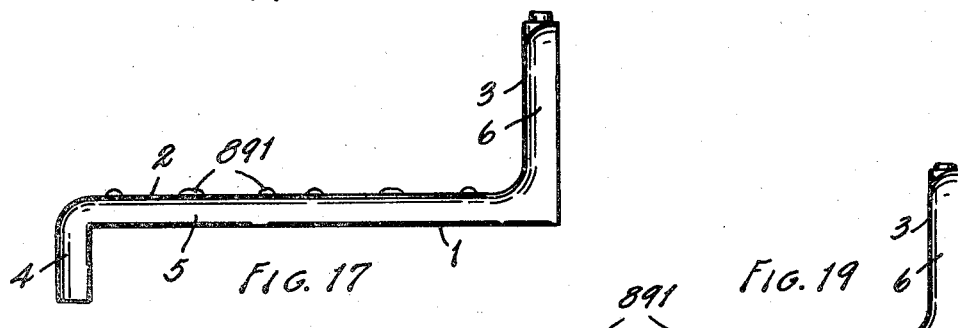
Fig. 17 is an end view of the top unit.
Fig. 19 is an end view corresponding to that of Fig. 17 of a modified form or embodiment of the invention in which the end flange of the top unit is extended to the full width of the apron portion thereof.
Figure 18:
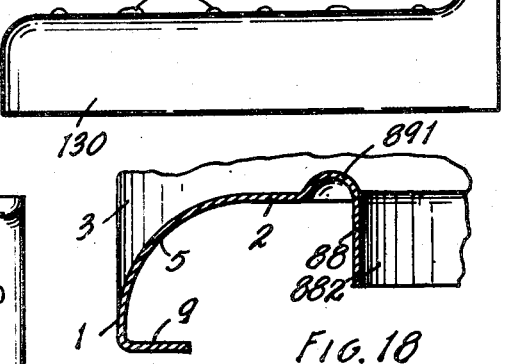
Fig. 18 is a fragmentary sectional view taken on line 18—18 of Fig. 16.

In the embodiment shown in Fig. 19, the top is provided with end flanges 130 corresponding to the end flanges 5, the end flange 130 being of the full width of the apron or front flange 4. In using the top of Fig. 21, the outer end panel 71 would be correspondingly shortened.

Structures embodying the invention are very attractive in appearance and may be very economically produced, an important feature of advantage being that the enameled exposed portions are secured to the frame or body structure by concealed fastenings and the enamel is not likely to be fractured or injured in mounting these outer or exposed parts. As stated, a further advantage is that the frame or body structure is formed entirely of sheet metal, the parts being secured together by spot-welding and in effect it becomes a very rigid unitary structure capable of withstanding strains and stresses in handling and shipment without danger of the wracking or loosening of joints, this being a condition which can not be obtained in ordinary manufacturing practice where rivets or bolts are used.

The structure has the further advantage that, if desired, the body or frame structure may be shipped or crated for shipment separately from the enamel parts which require more careful packing or crating.

While we have illustrated our invention as embodied in a gas stove the structure may be readily adapted as an electric stove or even as a liquid fuel burner. We have not attempted to illustrate or describe other embodiments and adaptations as we believe this disclosure will enable those skilled in the art to embody or adapt the invention as may be desired.

Having thus described our invention, what we claim as new and desire to secure by Letters Patent, is:

1. A cooking stove or range comprising a frame-like front member provided with door openings and having rearwardly projecting bottom and end flanges, a back wall having flanges at its end edges, top end cross members disposed with their front ends within the end flanges of said front frame member and welded thereto and lapped upon the end flanges of said back wall and welded thereto, bottom end cross members having their front ends disposed within the end flanges of said front frame member and welded thereto and lapped upon the end flanges of said back wall and welded thereto, a combustion chamber bottom member having flanged edges, its rear flange being welded to the back wall and its front flange being welded to the inner side of said front frame member and its end flanges welded to said top end cross members, said burner chamber bottom member having a transverse central slot-like air inlet opening therein, a vertical partition member provided with a rear flange welded to said back wall and a front flange welded to the inner side of said front frame member, and an air flue member disposed in spaced relation to said partition member and having offset vertical edges welded to one side thereof to provide a flue open at the bottom and delivering to said central air inlet opening of said burner chamber bottom, said several parts so arranged and connected constituting a rigid unitary frame structure adapted to receive and support outer elements.

2. A cooking stove or range comprising a frame-like front member provided with door openings and having rearwardly projecting bottom and end flanges, a back wall having flanges at its end edges, top end cross members disposed with their front ends within the end flanges of said front frame member and welded thereto and lapped upon the end flanges of said back wall and welded thereto, bottom end cross members having their front ends disposed within the end flanges of said front frame member and welded thereto and lapped upon the end flanges of said back wall and welded thereto, a combustion chamber bottom member having flanged edges, its rear flange being welded to the back wall and its front flange being welded to the inner side of said front frame member and its end flanges welded to said top end cross members, said burner chamber bottom member having a transverse central slot-like air inlet opening therein, a vertical partition member provided with a rear flange welded to said back wall and a front flange welded to the inner side of said front frame member, an air flue member disposed in spaced relation to said partition member and having offset vertical edges welded to one side thereof to provide a flue open at the bottom and delivering to said central air inlet opening of said burner chamber bottom, and an oven chamber bottom having a rear flange welded to said back wall and an outer end flange welded to the adjacent bottom end cross member, said several parts so arranged and connected constituting a rigid unitary frame structure adapted to receive and support outer elements.

3. A cooking stove or range comprising a frame-like front member provided with door openings and having rearwardly projecting bottom and end flanges, a back wall having flanges at its end edges, top end cross members disposed with their front ends within the end flanges of said front frame member and welded thereto and lapped upon the end flanges of said back wall and welded thereto, bottom end cross members having their front ends disposed within the end flanges of said front frame member and welded thereto and lapped upon the end flanges of said back wall and welded thereto, outwardly facing channel-shaped inner end panels having their edges welded to the inner sides of said top and bottom cross members and constituting end air flue walls, said bottom cross members defining air inlet openings below said end panels, a combustion chamber bottom member having flanged edges, its rear flange being welded to the back wall and its front flange being welded to the inner side of said front frame member and its end flanges welded to said top end cross members, said burner chamber bottom member having a transverse central slot-like air inlet opening therein, a vertical partition member provided with a rear flange welded to said back wall and a front flange welded to the inner side of said front frame member, an air flue member disposed in spaced relation to said partition member and having offset vertical edges welded to one side thereof to provide a flue open at the bottom and delivering to said central air inlet opening of said burner chamber bottom, and an oven chamber bottom having a rear flange welded to said back wall and an outer end flange welded to the adjacent bottom end cross member, said several parts so arranged and connected constituting a rigid unitary frame structure adapted to receive and support outer elements.

4. A frame or body structure for a cooking stove or range comprising a frame-like front member provided with door openings and having rearwardly projecting end and bottom flanges, a back wall having end and bottom flanges, top end cross members welded to the end flanges of said front member and back wall, bottom end cross members welded to the end flanges of said front frame and back wall and having their lower portions inset providing downwardly facing shoulders and their bottom edges turned inwardly providing horizontal base portions of substantial width, said base portions being welded to the bottom flanges of said front member and said back wall, vertical inner end panels welded along portions of their vertical edges to the inner sides of said top and bottom end cross members and spaced inwardly from said cross members along the intermediate portion of said inner panels, a combustion chamber bottom member having flanges at its front and rear edges welded respectively to said front member and back wall and having flanges at the front and back of its ends welded to said top end cross members, the ends of said combustion chamber bottom member being cut away to receive the inwardly spaced intermediate portions of the upper ends of said inner end panels, a vertical partition member provided with front and rear flanges welded to said front member and said back wall, an oven chamber bottom member welded to said vertical partition member and to said back wall and to the adjacent bottom cross member, and outer end wall panels having inturned flanges at their front and top and bottom edges, their top flanges being in supported engagement with the tops of said top cross members, their bottom flanges engaging said shoulders on said bottom cross members and their front flanges overlapping said front member, said outer end wall panels coacting with said inner panels in providing air circulating flues of substantial width and delivering above said combustion chamber bottom member, said bottom end cross members having air inlet openings below the said insert portions thereof.

5. A frame or body structure for a cooking stove or range comprising a frame-like front member provided with door openings and having rearwardly projecting end and bottom flanges, a back wall having end flanges, top end cross members welded to the end flanges of said front member and back wall, bottom end cross members welded to the end flanges of said front frame and back wall and having their lower portions inset providing downwardly facing shoulders, vertical inner end panels welded along portions of their vertical edges to the inner sides of said top and bottom end cross members and spaced inwardly from said cross members along the intermediate portion of said inner panels, a combustion chamber bottom member having flanges at its front and rear edges welded respectively to said front member and back wall and having flanges at the front and back of its ends welded to said top end cross members, the ends of said combustion chamber bottom member being cut away to receive the inwardly spaced intermediate portions of the upper ends of said inner end panels, a vertical partition member provided with front and rear flanges welded to said front member and said back wall, an oven chamber bottom member welded to said vertical partition member and to said back wall and to the adjacent bottom cross member, and outer end wall panels having inturned flanges at their front and top and bottom edges, their top flanges being in supported engagement with the tops of said top cross members, their bottom flanges engaging said shoulders on said bottom cross members and their front flanges overlapping said front member, said outer end wall panels coacting with said inner panels in providing air circulating flues of substantial width and delivering above said combustion chamber bottom member, said bottom end cross members having air inlet openings below the said inset portions thereof.

6. A frame or body structure for a cooking stove or range comprising a frame-like front member provided with door openings and having rearwardly projecting end and bottom flanges, a back wall having end and bottom flanges, top end cross members welded to the end flanges of said front member and back wall, bottom end cross members welded to the end flanges of said front frame and back wall and having their lower portions inset providing downwardly facing shoulders and their bottom edges turned inwardly providing horizontal base portions of substantial width, said base portions being welded to the bottom flanges of said front member and said back wall, vertical inner end panels welded along portions of their vertical edges to the inner sides of said top and bottom end cross members and spaced inwardly from said cross members along the intermediate portion of said inner panels, a combustion chamber bottom member having flanges at its front and rear edges welded respectively to said front member and back wall and having flanges at the front and back of its ends welded to said top end cross members, the ends of said combustion chamber bottom member being cut away to receive the inwardly spaced intermediate portions of the upper ends of said inner end panels, and outer end wall panels having inturned flanges at their front and top and bottom edges, their top flanges being in supported engagement with the tops of said top cross members, their bottom flanges engaging said shoulders on said bottom cross members and their front flanges overlapping said front member, said outer end wall panels coacting with said inner panels in providing air circulating flues of substantial width and delivering above said combustion chamber bottom member, said bottom end cross members having air inlet openings below the said inlet portions thereof.

7. A frame or body structure for a cooking stove or range comprising a frame-like front member provided with door openings and having rearwardly projecting end and bottom flanges, a back wall having end and bottom flanges, top end cross members fixedly secured to the end flanges of said front member and back wall, bottom end cross members fixedly secured to the end flanges of said front frame and back wall and having their lower portions inset providing downwardly facing shoulders and their bottom edges turned inwardly providing horizontal base portions of substantial width, said base portions being fixedly secured to the bottom flanges of said front member and said back wall, a combustion chamber bottom member having flanges at its front and rear edges welded respectively to said front member and back wall and having flanges at its ends fixedly secured to said top end cross members, a vertical partition member provided with front and rear flanges fixedly secured to said front member and said back wall, an oven chamber bottom member fixedly secured to said vertical partition member and to said back wall and to the adjacent bottom cross member, and end panels having inturned flanges at their edges, their top flanges being in supported engagement with the tops of said top cross members, their bottom flanges engaging said shoulders on said bottom cross members, their front flanges overlapping said front member.

8. A frame or body structure for a cooking stove or range comprising a frame like front member provided with door openings and having rearwardly projecting end and bottom flanges, a back wall having end flanges, top end cross members fixedly secured to the end flanges of said front member and back wall, bottom end cross members fixedly secured to the end flanges of said front frame and back wall and having their lower portions inset providing downwardly facing shoulders, a combustion chamber bottom member having flanges at its front and rear edges welded respectively to said front member and back wall and having flanges at its ends fixedly secured to said top end cross members, a vertical partition member provided with front and rear flanges fixedly secured to said front member and said back wall, an oven chamber bottom member fixedly secured to said vertical partition member and to said back wall and to the adjacent bottom cross member, and end panels having inturned flanges at their edges, their top flanges being in supported engagement with the tops of said top cross members, their bottom flanges engaging said shoulders on said bottom cross members, their front flanges overlapping said front member.

9. A frame or body structure for a cooking stove or range comprising a frame-like front member provided with door openings and having rearwardly projecting end and bottom flanges, a back wall having end and bottom flanges, top end cross members fixedly secured to the end flanges of said front member and back wall, bottom end cross members fixedly secured to the end flanges of said front frame and back wall and having their lower portions inset providing downwardly facing shoulders and their bottom edges turned inwardly providing horizontal base portions of substantial width, said base portions being fixedly secured to the bottom flanges of said front member and said back wall, a combustion chamber bottom member having flanges at its front and rear edges welded respectively to said front member and back wall and having flanges at its ends fixedly secured to said top end cross members, and end panels having inturned flanges at their edges, their top flanges being in supported engagement with the tops of said top cross members, their bottom flanges engaging said shoulders on said bottom cross members, their front flanges overlapping said front member.

10. A cooking stove or range comprising a front member having a bottom horizontal member, a top horizontal member, and side and intermediate uprights forming door openings having rearwardly projecting flanges at their edges adapted for the attachment of parts thereto, a back wall having forwardly projecting flanges at its top, bottom and end edges, top end cross members disposed with their front ends within the outer vertical flanges of said front member and welded thereto and lapped upon the end flanges of said back wall and welded thereto, bottom end cross members, said bottom cross members having their front ends disposed on the inner sides of the outer upright flanges of said front member and welded thereto and lapped upon the end flanges of said back wall and welded thereto, a burner chamber bottom member having flanged edges, its rear flange being welded to the back wall and its front flange being welded to the inner side of said front member and its end flanges welded to said top end cross members, said burner chamber bottom member having a transverse central slot-like air inlet opening therein, a vertical partition member provided with a rear flange welded to said back wall and a front flange welded to the inner side of the intermediate upright of said front member, and a combined reinforcing element and flue member disposed in spaced relation to said partition member and having vertical flanges welded to one side thereof to provide a flue open at the bottom and delivering to said central air inlet opening of said burner chamber bottom, said several parts so arranged and connected constituting a rigid unitary frame structure adapted to receive and support outer elements.

11. A cooking stove or range comprising a front member having a bottom horizontal member, a top horizontal member, and side and intermediate uprights forming door openings having rearwardly projecting flanges at their edges adapted for the attachment of parts thereto, a back wall having forwardly projecting flanges at its top, bottom and end edges, top end cross members disposed with their front ends within the outer vertical flanges of said front member and welded thereto and lapped upon the end flanges of said back wall and welded thereto, bottom end cross members, said bottom cross members having their front ends disposed on the inner sides of the outer upright flanges of said front member and welded thereto and lapped upon the end flanges of said back wall and welded thereto, and a burner chamber bottom member having flanged edges, its rear flange being welded to the back wall and its front flange being welded to the inner side of said front member and its end flanges welded to said top end cross members, said burner chamber bottom member having a transverse central slot-like air inlet opening therein.

12. In a cooking stove or range, the combination of a front frame member provided with rearwardly projecting end flanges and having door openings with inwardly projecting flanges at their edges, a back wall, top end cross members disposed with their front ends within the end flanges of said front frame and welded thereto and welded to the ends of said back wall, bottom end cross members having their lower portions inset providing downwardly facing shoulders, said bottom cross members having their front ends disposed within and welded to the inner sides of the end flanges of said front frame and welded to the ends of said back wall, a burner chamber bottom member welded to the back wall and to the inner side of said front frame, its ends being welded to said top end cross members, said several parts so arranged and connected constituting a rigid unitary frame structure, a front facing member overlying said front frame and having inwardly projecting portions overlapping and secured to corresponding portions of said front frame, end walls having inturned top flanges overlapping said top end cross members and bottom flanges engaged below the shoulders of said bottom end cross members and front flanges overlapping the ends of said front frame, and an integral top unit comprising a top surface portion, a rear fence portion and a depending front apron portion, all provided with integral merging end portions, the end portions of the top surface having inturned flanges at the bottoms thereof engaged with the said top cross members, said apron portion enclosing the upper portion of said front frame and having an inturned flange at the bottom thereof secured to said front frame.

13. In a cooking stove or range, the combination of a front frame member provided with rearwardly projecting end flanges and having door openings with inwardly projecting flanges at their edges, a back wall, top end cross members disposed with their front ends within the end flanges of said front frame and welded thereto and welded to the ends of said back wall, bottom end cross members having their lower portions inset providing downwardly facing shoulders, said bottom cross members having their front ends disposed within and welded to the inner sides of the end flanges of said front frame and welded to the ends of said back wall, a burner chamber bottom member welded to the back wall and to the inner side of said front frame, its ends being welded to said top end cross members, said several parts so arranged and connected constituting a rigid unitary frame structure, a front facing member overlying said front frame and having inwardly projecting portions overlapping and secured to corresponding portions of said front frame, and end walls having inturned top flanges overlapping said top end cross members and bottom flanges engaged below the shoulders of said bottom end cross members and front flanges overlapping the ends of said front frame.

14. In a cooking stove or range, the combination of a front frame member provided with rearwardly projecting end flanges, and having door openings with inwardly projecting flanges at their edges, a back wall, top end cross members disposed with their front ends fixedly secured to the end flanges of said front frame and to the ends of said back wall and having inwardly projecting flanges at their upper edges, bottom end cross members having their lower portions inset providing downwardly facing shoulders, said bottom cross members having their front ends fixedly secured to the end flanges of said front frame and to the ends of said back wall, a front facing member overlying said front frame and having inwardly projecting portions overlapping and secured to corresponding portions of said front frame, outwardly facing clips secured to said inwardly projecting flanges on the upper edges of said top end cross members to face outwardly, end walls having inturned top flanges overlapping the flanges of said top end cross members in engagement with certain clips thereon and bottom flanges engaged below the shoulders of said bottom end cross members and front flanges overlapping the ends of said front frame, and an integral top unit comprising a top surface portion, a rear fence portion and a depending front apron portion, all provided with integral merging end portions, the end portions of the top surface having inturned flanges at the bottoms thereof engaged with certain of said clips, said apron portion enclosing the upper portion of said front frame and having an inturned flange at the bottom thereof secured to said front frame.

15. In a cooking stove or range, the combination of a front frame member provided with rearwardly projecting end flanges and having door openings with inwardly projecting flanges at their edges, a back wall, top end cross members disposed with their front ends fixedly secured to the end flanges of said front frame and to the ends of said back wall, bottom end cross members having their lower portions inset providing downwardly facing shoulders, the inset portions of said bottom end cross members defining apertures forming air openings and partially concealed by said shoulders, said bottom cross members having their front ends fixedly secured to the end flanges of said front frame and to the ends of said back wall, a front facing member overlying said front frame and having inwardly projecting portions overlapping and secured to corresponding portions of said front frame, outwardly facing clips on said top end cross members, end walls having inturned top flanges in engagement with certain of said clips and bottom flanges engaged below the shoulders of said bottom end cross members and front flanges overlapping the ends of said front frame, and an integral top unit comprising a top surface portion, a rear fence portion and a depending front apron portion, the end portions of the top surface having inturned flanges engaged with certain of said clips, said apron portion enclosing the upper portion of said front frame and being secured thereto by concealed fastenings.

16. In a cooking stove or range, the combination of a front frame member provided with rearwardly projecting end flanges and having door openings with inwardly projecting flanges at their edges, a back wall, top end cross members disposed with their front ends fixedly secured to the end flanges of said front frame and to the ends of said back wall, bottom end cross members having their lower portions inset providing downwardly facing shoulders, said bottom cross members having their front ends fixedly secured to the end flanges of said front frame and to the ends of said back wall, a front facting member overlying said front frame and having inwardly projecting portions overlapping and secured to corresponding portions of said front frame, outwardly facing clips on said top end cross members, and end walls having inturned top flanges in engagement with said clips and bottom flanges engaged below the shoulders of said bottom end cross members and front flanges overlapping the ends of said front frame.

17. In a cooking stove or range, the combination of a front frame member having door openings and inwardly projecting flanges at the ends thereof and at least at a part of the edges of the door openings, a back member, top and bottom cross members fixedly secured to said front frame end flanges and to said back member, inner end panels fixedly secured to the inner sides of said end cross members, a burner chamber bottom member fixedly secured to said front frame member, back member and top end cross members, a front facing member for said front frame having inwardly projecting flanges overlapping and secured to said flanges at the edges of said door openings, end walls having inturned top flanges lapped upon said top cross members and bottom flanges engaging said bottom cross members and front flanges overlapping the ends of said front facing member, and an integral top unit comprising a top surface portion, a rear fence portion, and a depending front portion, all provided with merging end portions, the end portions and front portions having inturned flanges, the flanges of said end portions being secured to said top cross member and the flange of said front portion being secured to said front frame by concealed fastenings.

18. In a cooking stove or range, the combination of a front frame member having door openings and inwardly projecting flanges at the ends thereof and at least at a part of the edges of the door openings, a back member, top and bottom cross members fixedly secured to said front frame end flanges and to said back member, a burner chamber bottom member fixedly secured to said front frame member, back member and top cross members, a front facing member for said front frame having inwardly projecting flanges overlapping and secured to said flanges at the edges of said door openings, end walls having inturned top flanges lapped upon said top cross members and bottom flanges engaging said bottom cross members and front flanges overlapping the ends of said front facing member, and an integral top unit comprising a top surface portion, a rear fence portion, and a depending front portion, all provided with merging end portions, the end portions and front portions having inturned flanges, the flanges of said end portions being secured to said top cross members and the flange of said front portion being secured to said front frame by concealed fastenings.

19. A stove or range comprising a front frame, a rear member, end members fixedly secured to said front frame and rear member and having portions thereof of substantial area struck inwardly to provide inner air flue walls, said end members having outwardly facing clips on the upper edges thereof, end walls having inturned flanges at the top thereof retainingly engaged by said clips and front flanges overlapping said front frame, said end walls constituting outer flue walls, and a top unit having a depending front and end portions, said end portions having inturned flanges at the bottom edges thereof engaging said outwardly facing clips, said front portion having an inturned flange secured to said front frame.

20. A stove or range comprising a front frame, a rear member, end members fixedly secured to said front frame and rear member and having portions thereof of substantial area struck inwardly to provide inner air flue walls, end walls having inturned flanges at the top thereof retainingly supported on top of said end members and front flanges overlapping said front frame, said end walls constituting outer flue-walls, and a top unit having a depending front and end portions, said end portions having inturned flanges at the bottom edges thereof, said inturned flanges being secured to said end members.

JAMES M. COOK.
SHIRLY C. SALTER.

REFERENCES CITED

The following references are of record in the file of this patent:

UNITED STATES PATENTS

| Number | Name | Date |
| --- | --- | --- |
| 1,453,710 | Hoffman | May 1, 1923 |
| 1,575,451 | Scheib | Mar. 2, 1926 |
| 1,921,762 | Leins | Aug. 8, 1933 |
| 2,039,539 | Klute | May 5, 1936 |
| 2,140,408 | Sherman | Dec. 13, 1938 |
| 2,161,537 | Stockstrom et al. | June 6, 1939 |
| 2,196,724 | Esson | Apr. 9, 1940 |
| 2,217,059 | Klute | Oct. 8, 1940 |
| 2,262,016 | Leonard et al. | Nov. 11, 1941 |
| 2,295,915 | Ring | Sept. 15, 1942 |
| 2,335,279 | Hobson | Nov. 30, 1943 |
| 2,364,950 | Cook | Dec. 12, 1944 |
| 2,418,152 | Avery | Apr. 1, 1947 |